(12) United States Patent
Sugiyama et al.

(10) Patent No.: US 6,855,416 B2
(45) Date of Patent: Feb. 15, 2005

(54) THIN FILM MAGNETIC RECORDING MEDIUM

(75) Inventors: Masahiko Sugiyama, Yokohama (JP); Masaru Segawa, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 51 days.

(21) Appl. No.: 10/273,717

(22) Filed: Oct. 17, 2002

(65) Prior Publication Data

US 2003/0072968 A1 Apr. 17, 2003

(30) Foreign Application Priority Data

Oct. 17, 2001 (JP) ........................................ 2001-319112

(51) Int. Cl.[7] .............................. G11B 5/62; G11B 5/64; G11B 05/65; G11B 5/66
(52) U.S. Cl. ................... 428/336; 428/692; 428/694 T; 428/694 TS
(58) Field of Search ............... 428/336, 457, 428/692, 694 T, 694 TS

(56) References Cited

U.S. PATENT DOCUMENTS

| | | | | | |
|---|---|---|---|---|---|
| 4,842,917 A | * | 6/1989 | Ohno et al. | ................. | 428/141 |
| 5,554,440 A | * | 9/1996 | Ishida et al. | ................. | 428/336 |
| 6,146,754 A | * | 11/2000 | Song et al. | ................. | 428/332 |

FOREIGN PATENT DOCUMENTS

| | | | |
|---|---|---|---|
| JP | 02021417 | * | 1/1990 |
| JP | 5-59549/1993 | | 3/1993 |
| JP | 5-325167/1993 | | 12/1993 |
| JP | 6-4862/1994 | | 1/1994 |
| JP | 11-161934/1999 | | 6/1999 |
| JP | 2988188 | | 12/1999 |
| JP | 3093818 | | 10/2000 |

OTHER PUBLICATIONS

Transactions of the Magnetics Society of Japan, vol. 21, No. 4–2, pp. 229–232, published in 1997 Title: "Effect of a CoO Underlayer on Co–O Films Deposited Obliquely" by K. Tohma, et al of Matushita Electric Industrial Co., Ltd.

IEEE Transactions on Magnetics, vol. 36, No. 1, pp. 183–188, published in 2000 Title: "More than 1 Gb/in2 Recording on Obliquely Oriented Thin Film Tape" by Tatsuaki Ishida, et al of Matsushita Electric Industrial Co., Ltd.

IEEE Transactions on Magnetics vol. 35, No. 5, pp. 2688–2690, published in 1999 Title: "Characteristics of Me Tape Made at 1 u m/s Depostion Rate" by Y. Maezawa, et al of Matsushita Electric Industrial Co., Ltd.

* cited by examiner

Primary Examiner—D. S. Nakarani
(74) Attorney, Agent, or Firm—Anderson Kill & Olick; Eugene Lieberstein; Michael N. Meller

(57) ABSTRACT

A thin film magnetic recording medium (30) is composed of an underlayer film (32), which is constituted by a nonmagnetic metal oxide film and formed on a nonmagnetic substrate (31), and a magnetic film (33) of Co system, which is formed on the underlayer film (32) through an oblique evaporation process, wherein each of the underlayer film and the magnetic film is laminated in order. Fine particles of the nonmagnetic metal oxide film grow isotropically in the underlayer film (32) constituted by the nonmagnetic metal oxide film and the underlayer film (32) is formed in a construction without having a clear grain boundary, which separates a aggregation of the fine particles.

5 Claims, 13 Drawing Sheets

THIN FILM MAGNETIC RECORDING MEDIUM

BACKGROUND OF THE INVENTION

1. Field of the Invention

The present invention relates to a thin film magnetic recording medium, which is composed of an underlayer film of a nonmagnetic metal that is formed on a nonmagnetic substrate by a sputtering method and a magnetic film that is formed on the underlayer film by an oblique evaporation process.

2. Description of the Related Art

Recently, recording density of a magnetic recording medium is rapidly advanced towards higher density. During the process of advancing towards higher density, it is commonly known that a magnetic recording medium has been shifted from an iron oxide tape having high coercive force and high magnetic flux density to a metal tape and a thin film magnetic recording medium (thin film magnetic tape) having higher performance.

With respect to an application of such a magnetic recording medium, in the field of a VTR (Video Tape Recorder), for example, a thin film magnetic tape has been gained attention so as to accomplish digitalization and high definition.

A so-called evaporation tape in which a magnetic film is formed by the oblique evaporation process has been put into practical use as a thin film magnetic tape.

By using a piercing electron gun that will be detailed later, such an evaporation tape is manufactured by such that an electron beam emitted form the piercing electron gun is applied to a magnetic material such as Co (cobalt) and CoNi placed in a crucible in a vacuum chamber, and the magnetic material is melted and evaporated while injecting oxygen gas, and then a thin film containing CoO and CoNiO is formed on a base film made of PET (polyethylene terephthalate), PEN (polyether naphthalate), PI (polyimide) or PA (polyamide).

FIG. 15 is a plan view of a general film-forming apparatus, which applies the oblique evaporation process, for producing a thin film magnetic recording medium according to the prior art. As shown in FIG. 15, a film-forming apparatus 20 for producing a thin film magnetic recording medium (thin film magnetic tape) maintains a vacuum condition inside a vacuum chamber 1 by a vacuum pump (not shown). Inside the vacuum chamber 1, there provided one set of film winding rolls 2 and 3, one set of tape guide rolls 4 and 5, and a cooling can roll 7.

During ordinarily forming a film on a base film 6, the base film 6 wound around the film winding roll 2 (hereinafter referred to as supply roll 2) runs through the tape guide roll 4, the cooling can roll 7, and the other tape guide roll 5 in a forward direction shown by arrows to the other film winding roll 3 (hereinafter referred to as take-up roll 3).

The base film 6 is made of, for example, a PET (polyethylene terephthalate) film having a predetermined thickness as a substrate for a thin film magnetic tape.

A cooling device (not shown) is installed inside the cooling can roll 5 so as to prevent deformation of the base film 6 caused by increased temperature during an evaporation process.

A crucible 8, which is formed in a box shape and contains a magnetic metal material 11 such as Co, is installed at a lower right hand corner from the cooling can roll 7 inside the vacuum chamber 1.

A piercing electron gun 12, which is an evaporation heat source to melt and evaporate the magnetic metal material 11 in the crucible 8, is mounted on a right wall 1a of the vacuum chamber 1 with pointing at the crucible 8 located diagonally downward to the left. The piercing electron gun 8 emits an electron beam 13 towards the magnetic metal material 11 inside the crucible 8. The electron beam 13 melts the magnetic metal material 11 and evaporates so as to coat a surface of the base film 6, which is moving along the cooling can roll 7.

It is essential to cover both edges of the base film 6 so as to prevent a magnetic metal vapor 11a, which evaporated from the crucible 8, from evaporating on the cooling can roll 7 while the base film 6 is running.

Further, it is also essential to control an incidence angle of evaporation of the magnetic metal vapor 11a such as evaporated Co with respect to a surface of the base film 6 due to the improvement of recording characteristics when producing a thin film magnetic tape. In order to prevent deposits in inappropriate areas, incidence angle controlling masks 9 and 10 are installed between the cooling can roll 7 and the crucible 8 as shown in FIG. 15.

Allocating one incidence angle controlling mask 9 to a predetermined position of the cooling can roll 7 controls a maximum incidence angle "$\theta$ max" of the magnetic metal vapor 11a of the magnetic metal material 11 with respect to the base film 6. On the other hand, allocating the other incidence angle controlling mask 10 to another predetermined position of the cooling can roll 7 controls a minimum incidence angle "$\theta$ min".

While the base film 6 is running along the outer circumference of the cooling can roll 7, the magnetic metal vapor 11a is deposited on the surface of the base film 6 within a range of angle from a maximum incidence angle to a minimum incidence angle that is adjusted to a predetermined angle, wherein the range of angle is referred to as an evaporation opening area, and then a magnetic film is formed on the surface of the base film 6. Magnetic characteristics of the magnetic film are decided by the maximum incidence angle "$\theta$ max" and the minimum incidence angle "$\theta$ min" of the magnetic metal vapor 11a of the magnetic metal material 11. Generally, the maximum incidence angle "$\theta$ max" is set to 90 degrees and the minimum incidence angle "$\theta$ min" is set to 40 degrees.

An oxygen gas injection pipe (not shown) is installed between the cooling can roll 7 and the incidence angle controlling mask 10 inside the minimum incidence angle "$\theta$ min" side. Oxygen gas $O_2$ blows off through a plurality of holes (not shown) provided on the oxygen gas injection pipe towards the magnetic metal vapor 11a evaporated from the crucible 8.

The electron beam 13 emitted from the piercing electron gun 12 is controlled by a deflection magnet 15, which supplies a deflection magnetic field onto a trajectory of the electron beam 13, and another deflection magnet 14, which is installed near the crucible 8. By scanning the electron beam 13 in the longitudinal direction of the crucible 8, the magnetic metal vapor 11a such as evaporated Co is thinly deposited on the surface of the base film 6 as a partial oxide magnetic film such as Co—CoO in a lateral direction of the base film 6. By depositing the partial oxide magnetic film on the base film 6 continuously in the longitudinal direction of the base film 6, a long enough thin film magnetic tape is taken up by the take-up roll 3.

There provided another scanning method of the electron beam 13 such that an ongoing-straight electron beam 13 emitted from the piercing electron gun 12 is controlled to scan the crucible 8 by only the deflection magnet 15 without installing the deflection magnet 14 near the crucible 8. Such a scanning method is also applicable.

FIG. 16 is a partially enlarged cross sectional view of a thin film magnetic recording medium (thin film magnetic tape) produced by the film-forming apparatus 20 shown in FIG. 15, which applies the oblique evaporation process, and exemplarily exhibits states of a nonmagnetic underlayer film and a magnetic film that is formed on the nonmagnetic underlayer film, which constitute a part of the thin film magnetic tape. In other words, FIG. 16 shows an exemplary configuration of the cross section of the thin film magnetic tape of which the magnetic film is cut along the longitudinal direction of the base film and is illustrated exemplarily from a cross sectional picture that is enlarged as large as 500 to 2500 thousands times, which is obtained by observing the cross section through the transmission electron microscope (model H-800 manufactured by Hitachi, Ltd.) at the acceleration voltage of 200 kV.

In FIG. 16, a reference sign 16 is a nonmagnetic underlayer film that is composed of a nonmagnetic metal oxide film such as CoO having a columnar structure, which is formed on a nonmagnetic substrate to be a base film (not shown) by controlling an injection amount of oxygen gas and non-magnetizing magnetic metal vapor through the oblique evaporation process. The nonmagnetic underlayer film 16 is formed with a columnar area 16A, which contains a plurality of microscopic Co crystalline particles (hereinafter referred to as Co particles) and anther area 17A, which contains a plurality of microscopic CoO crystalline particles (hereinafter referred to as CoO particles), in the longitudinal direction of the base film (not shown). The columnar area 16A is formed in a shape that is perpendicular to the surface of the underlayer film 16 or slanted a little from the vertical direction of the underlayer film 16. A reference sign 18 is a magnetic film that is formed on the nonmagnetic underlayer film 16 by optimizing an injection amount of oxygen gas through the oblique evaporation process.

In other words, as mentioned above, the nonmagnetic underlayer film 16 of the thin film magnetic tape, which is produced by the conventional film-forming apparatus 20 through the oblique evaporation process, is composed of Co particles and CoO particles. Relative quantities of the Co particles and the CoO particles, which constitute each area of the nonmagnetic underlayer 16, are such that more CoO particles exist in the area 17A, which is allocated between columnar areas, and more Co particles exist inside the columnar area 16A.

The columnar area 16A having more Co particles is composed of a plurality of columnar areas 16a through 16n in the longitudinal direction. On the other hand, the area 17A having more CoO particles is composed of a plurality of areas 17a through 17n, which are sandwiched among the plurality of columnar areas 16a through 16n, in the longitudinal direction.

Consequently, a grain boundary, which fixes a boundary between the columnar area 16A having more Co particles and the area 17A having more CoO particles, is made clear.

Further, the magnetic film 18 is formed with columnar areas 18a through 18n having more Co particles and areas 19a through 19n having more CoO particles, which are sandwiched among the columnar areas 18a through 18n.

The plurality of columnar areas 18a through 18n is in a shape of slanting with respect to the surface of the magnetic film 18. In a case that a thin film magnetic tape is produced by forming a CoO magnetic film 18 on the nonmagnetic underlayer film 16 having the columnar areas 16a through 16n by the oblique evaporation process while injecting oxygen gas, the concentration of oxygen gas is lower than the case of forming a nonmagnetic CoO film.

Collision probability of a Co evaporated particle with injected oxygen gas becomes lower than the case of forming the nonmagnetic underlayer film (CoO film) 16, so that the Co evaporated particle is relatively high in a rate of traveling in a straight line, and further the Co evaporated particle is incident into a surface of substrate with slanted because the initial incidence angle is set to "θ max" as shown in FIG. 15. Consequently, it is supposed that an aggregation of particles grows towards a slanted direction close to an incidence direction and forms a columnar construction.

A magnetic flux induction-type head has been used for a conventional recording and reproducing head. However, a carrier to noise (CN) ratio has been limited by the thermal noise of the magnetic flux induction-type head.

Further, a reproduction output decreases in relation to lowering a relative speed between a head and a tape due to a trend of miniaturizing a recording apparatus, and resulted in becoming hard to record and reproduce a signal in a high bit rate.

On the other hand, it is essential for advancing a recording medium towards higher density to thin a film thickness of a magnetic film as well as increasing coercive force.

In a case of coping with the trend for increasing coercive force higher by using the magnetic flux induction-type head, if a film thickness of a magnetic film is drastically thinned, a problem such that a reproduction output decreases and resulted in decreasing a signal to noise (SN) ratio occurs. In order to solve such a problem, an MR (magnetoresistive) head, which applies a magnetoresistive effect, draws attention. The MR head can obtain a high output, independent of a speed relative to a recording medium.

Further, the MR head has a low resistance value in a whole range of band, so that the MR head is advantageous to reduce drastically a thermal noise in comparison with a magnetic flux induction-type head.

An MR element of the MR head is, however, saturated and an operating range of the MR element exceeds a linear area when an amount of magnetic flux from a recording medium exceeds a specific amount. Consequently, the MR head generates distortion in waveform and asymmetry of pulse.

On the other hand, an amount of magnetic flux that is absorbed by the MR element is in proportion to Brδ, that is, a cross product of residual flux density Br and a magnetic film thickness δ. Therefore, it is essential to assign Br and δ that is most suitable for a MR head. Generally, a magnetic film thickness δ that is most suitable for a MR head becomes thinner than that of a magnetic flux induction-type head.

In a case that a film thickness is thinned as thin as less than 1000 Å so as to assign a magnetic film, which is formed by the oblique evaporation process, to the most suitable film thickness for a MR head, there arose a problem such that coercive force Hc decreases drastically.

With respect to a method of solving the problem, a method such that forming an underlayer film of nonmagnetic CoO, which is formed by evaporating Co as a magnetic metal material in an atmosphere of oxygen gas through the oblique evaporation process, on a nonmagnetic substrate and forming a CoO magnetic film on the underlayer film through the oblique evaporation process prevents coercive force Hc in the range of less than 1000 Å of magnetic film thickness from deteriorating has been suggested in the Japanese Patent No. 2988188 and in the publication: Japanese Society of Applied Magnetics", vol. 121, No. 4-2 (1997), entitled "Effect of a CoO underlayer on CoO films evaporated obliquely".

According to the method mentioned above, when forming a Co—CoO magnetic film on growing particles of an isolated CoO nonmagnetic underlayer film, by isolating growing particles of the Co—CoO magnetic film with following the growing particles of the CoO nonmagnetic underlayer film, magnetic interaction among particles of the Co—CoO magnetic film can be reduced. Consequently, the method prevents magnetostaitc characteristics from deteriorating even in an extremely thin Co—CoO magnetic film. However, there existed some problems mentioned below by this method.

By this method,

① It is essential for the CoO nonmagnetic underlayer film to be formed in a thickness of more than 300 Å. Consequently, material cost increases.
② In a case of forming the CoO nonmagnetic underlayer film and the CoO magnetic film, a base film 6 must be passed through the tape-running path shown in FIG. 15 twice. Consequently, mass-productivity is extremely deteriorated.
③ Due to the 2-time running of the base film 6 as mentioned above, the provability of attaching dust on and scratching the surfaces of the substrata and the underlayer film increases, and resulted in increasing dropout of a thin film magnetic tape that is completed.
④ In order to solve the problem of inferior mass-productivity and complete the production of thin film magnetic tape by running the base film once, it is essential for the cooling can roll 7, the piercing electron gun 12 and the crucible 8 that two set of them are installed respectively. Consequently, too much facility introducing cost is not practical.

In consideration of the above-mentioned problems, it is found that the problems occur in an area such as a material of nonmagnetic underlayer film and its film thickness.

Further, it is also found that desired magnetic characteristics can not be obtained in some cases due to conditions of fine particles, which constitute a nonmagnetic underlayer film, although the nonmagnetic underlayer film has been formed excellently.

SUMMARY OF THE INVENTION

Accordingly, in consideration of the above-mentioned problems of the prior art, an object of the present invention is to provide a thin film magnetic recording medium, which can exhibit desired magnetostatic characteristics when a structure of fine particles constituting an underlayer film, a film thickness of the underlayer film and a material of the underlayer film is in a predetermined standard.

According to an aspect of the present invention, there provided a thin film magnetic recording medium comprising: an underlayer film constituted by a nonmagnetic metal oxide film and formed on a nonmagnetic substrate; and a magnetic film of Co (cobalt) system formed on the underlayer film through an oblique evaporation process, wherein the underlayer film and the magnetic film are laminated in order, the thin film magnetic recording medium is further characterized in that fine particles of the nonmagnetic metal oxide film grow isotropically in the underlayer film constituted by the nonmagnetic metal oxide film and the underlayer film is formed in a construction without having a clear grain boundary separating a aggregation of the fine particles.

Another aspect of the present invention, there provided a thin film magnetic recording medium comprising: an underlayer film constituted by a nonmagnetic metal nitride film and formed on a nonmagnetic substrate; and a magnetic film of Co (cobalt) system formed on the underlayer through an oblique evaporation process, wherein the underlayer film and the magnetic film are laminated in order.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
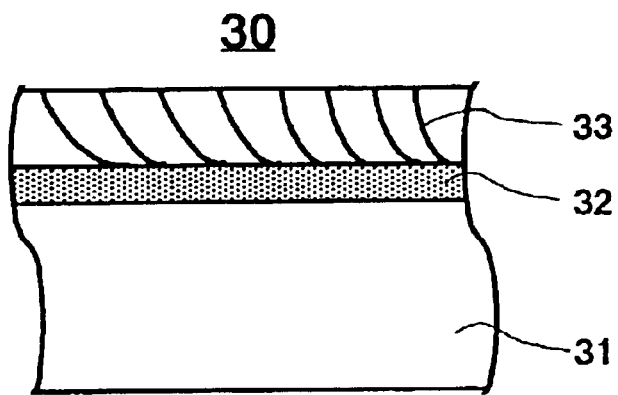
FIG. 1 is a cross sectional view of a thin film magnetic recording medium according to a first embodiment of the present invention.

FIG. 1 is a cross sectional view of a thin film magnetic recording medium according to a first embodiment of the present invention.

Figure 2:
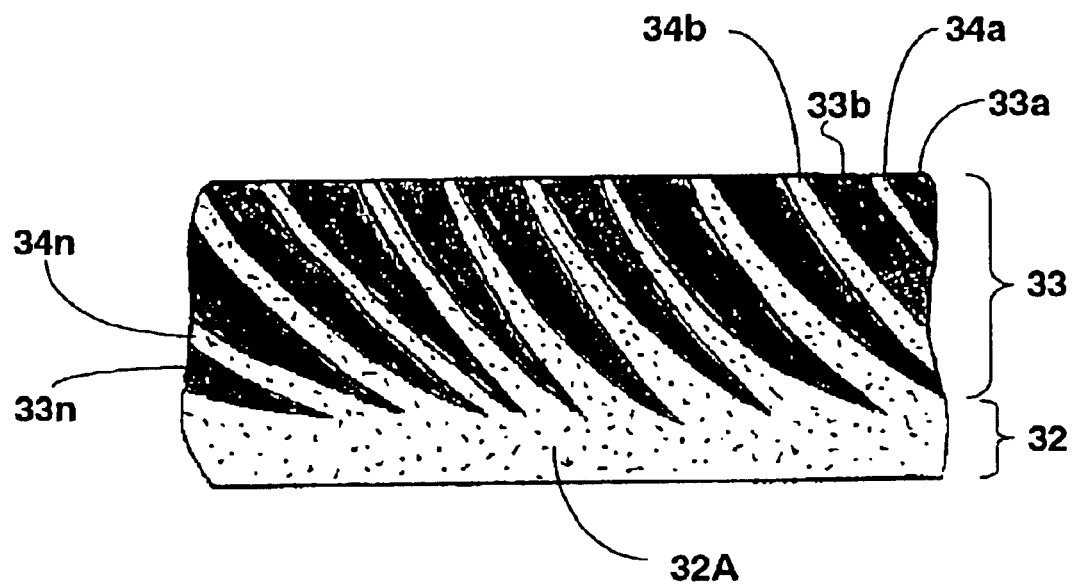
FIG. 2 is a model diagram showing a status of a nonmagnetic underlayer film and a magnetic film formed on the nonmagnetic underlayer film in the thin film magnetic recording medium shown in FIG. 1.

FIG. 2 is a model diagram showing an exemplary configuration of the cross section of a nonmagnetic underlayer film and a magnetic film formed on the nonmagnetic underlayer film in the thin film magnetic recording medium shown in FIG. 1, wherein the magnetic film is cut along the longitudinal direction of a base film and the drawing is illustrated exemplarily from a cross sectional picture that is enlarged as large as 500 to 2500 thousands times, which is obtained by observing the cross section through the transmission electron microscope (model H-800 manufactured by Hitachi, Ltd.) at the acceleration voltage of 200 kV.

In FIG. 1, a thin film magnetic recording medium 30 is composed of a nonmagnetic substrate 31 that is a base film made of a PET (polyethylene terephthalate) film or like, an underlayer film 32 of nonmagnetic metal oxide and a Co magnetic film 33 that is formed on the underlayer film 32 of nonmagnetic isotropic CoO (hereinafter referred to as underlayer film 32) through an oblique evaporation process. The underlayer film 32 is formed by a sputtering method with a nonmagnetic metal oxide of which fine particles grow isotropically on the nonmagnetic substrate 31 not by fine particles of nonmagnetic metal oxide that assemble cylindrically and grow, and further the underlayer film 32 is not formed with a clear grain boundary, which separates aggregation of the fine particles.

Figure 16:
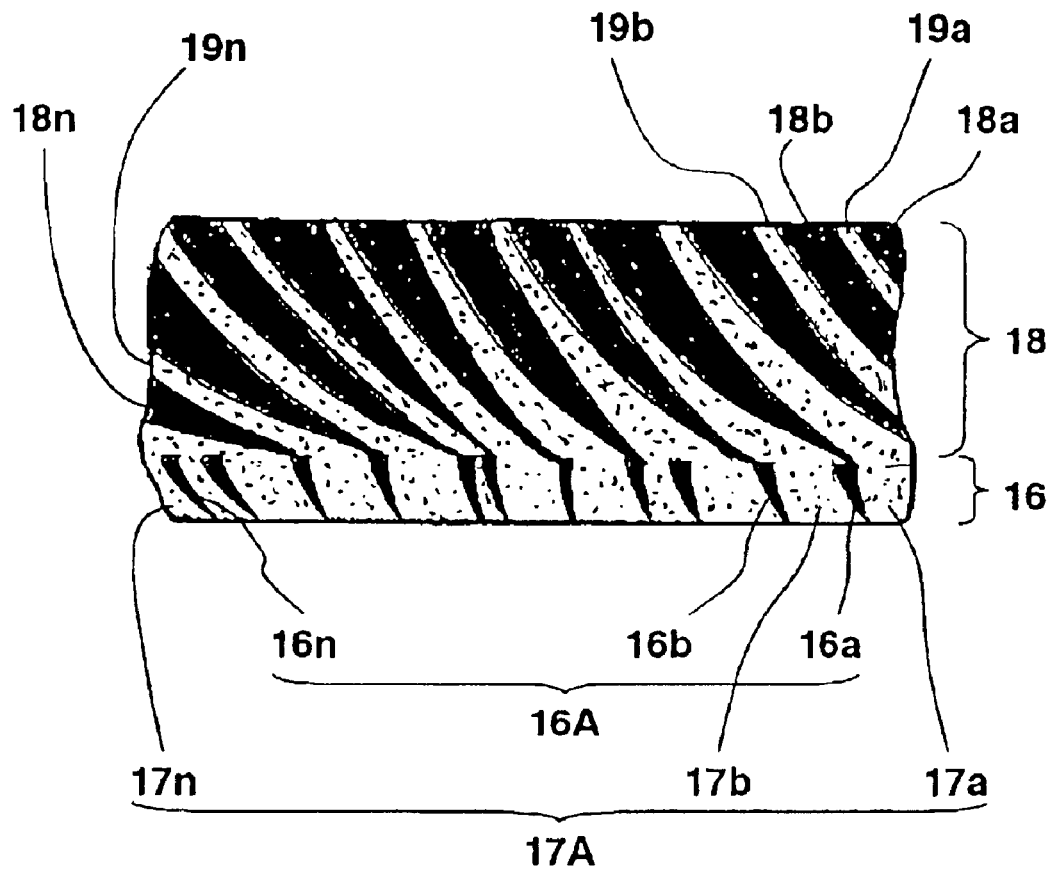
FIG. 16 is a model diagram showing a status of a nonmagnetic underlayer film and a magnetic film formed on the nonmagnetic underlayer film in the thin film magnetic recording medium produced by the film-forming apparatus shown in FIG. 15.

In FIG. 2, the underlayer film 32 is constituted by an area 32A having more CoO particles and the magnetic film 33 is composed of a plurality of columnar areas 33a through 33n having more Co particles and a plurality of areas 34a through 34n having more CoO particles. As shown in FIG. 2, the underlayer film 32 is constituted by only the area 32A having more CoO particles. Consequently, the configuration of the underlayer film 32 is different from that of the nonmagnetic underlayer film 16 shown in FIG. 16 of the prior art. In other words, there existed no columnar area having more Co particles in the underlayer film 32 within the region from the surface of the substrate to the surface at where the particle growth ceases. As the columnar area having more Co particles exists only in the CoO magnetic film 33, the underlayer film 32 is not arranged by a plurality of columnar-shaped Co particles, which is formed as a linear construction substantially in the longitudinal direction.

In this first embodiment, as the sputtering method is used for forming the underlayer film 32 of nonmagnetic CoO, a large amount of oxygen gas or argon gas to be injected can be used. Consequently, a pressure inside a vacuum chamber of film-forming apparatus for producing a thin film magnetic recording medium can be increased in comparison with the case of forming the nonmagnetic underlayer film 16 of columnar CoO through the oblique evaporation process according to the prior art, so that a Co particle sputtered from a sputter target, will be detailed later, reaches to the surface of a substrate from more random directions than that of an evaporated particle by the oblique evaporation process according to the prior art.

Further, particle energy by the sputtering method is higher than that by the oblique evaporation process, so that a moving amount of a particle reached to the surface of substrate is large. Accordingly, it is supposed that unlike the prior art, an isotropic construction as a CoO particle is obtained.

(Embodiment 1)

A method of producing the thin film magnetic recording medium 30 having the construction according to the first embodiment is detailed next.

Figure 3:
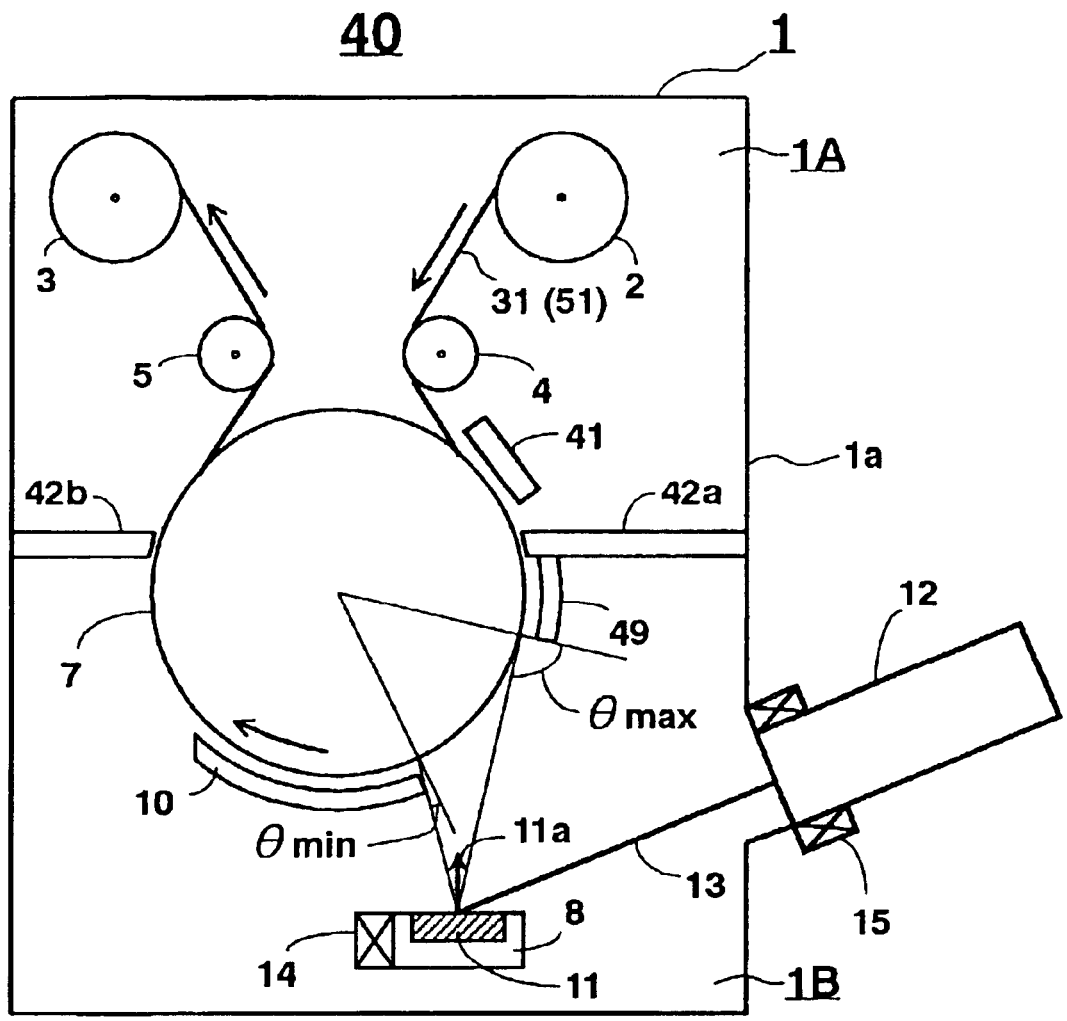
FIG. 3 is a plan view of a film-forming apparatus for producing a thin film magnetic recording medium according to the first embodiment of the present invention.

FIG. 3 is a plan view of a film-forming apparatus for producing a thin film magnetic recording medium according to the first embodiment of the present invention.

Figure 4:
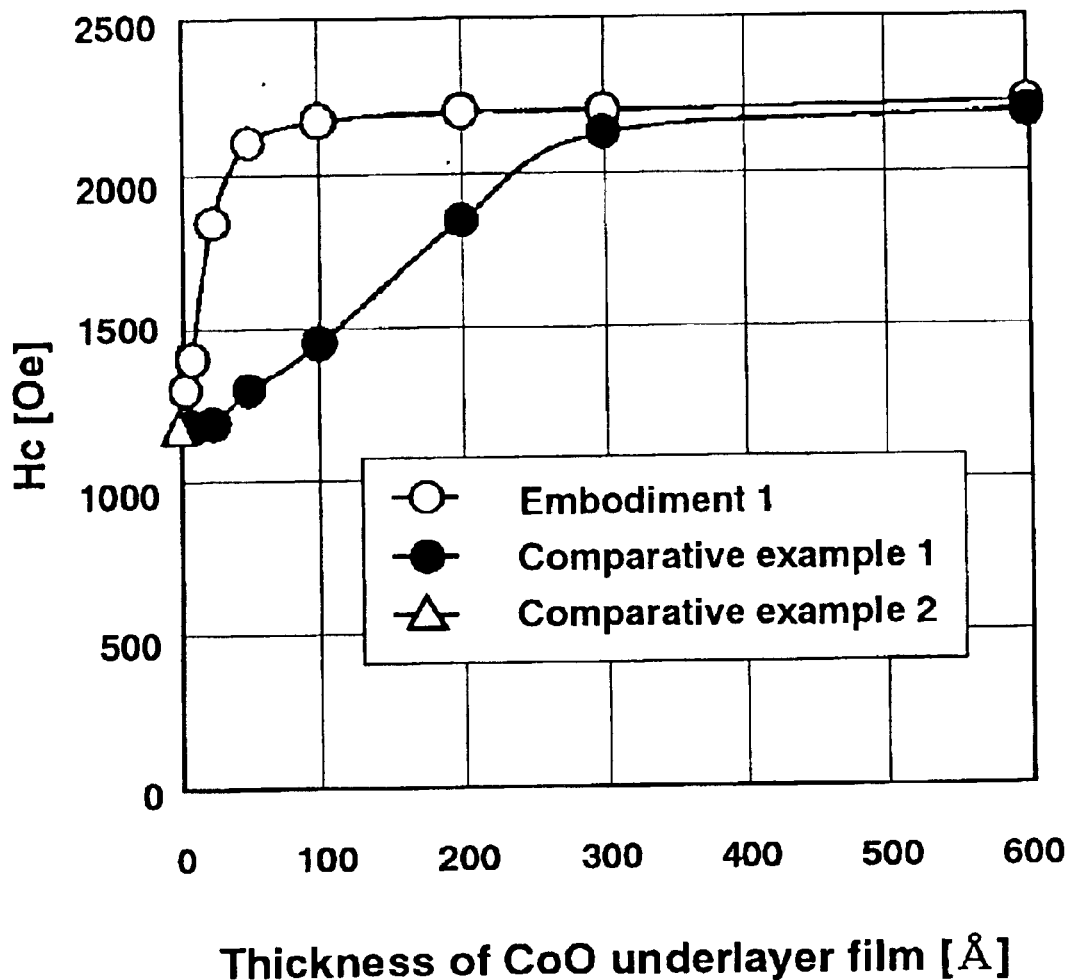
FIG. 4 is a graph showing a relation between a film thickness of a nonmagnetic underlayer film and coercive force of the thin film magnetic recording medium according to the first embodiment of the present invention.

FIG. 4 is a graph showing a relation between a film thickness of a nonmagnetic underlayer film and coercive force of the thin film magnetic recording medium according to the first embodiment of the present invention.

Figure 5:
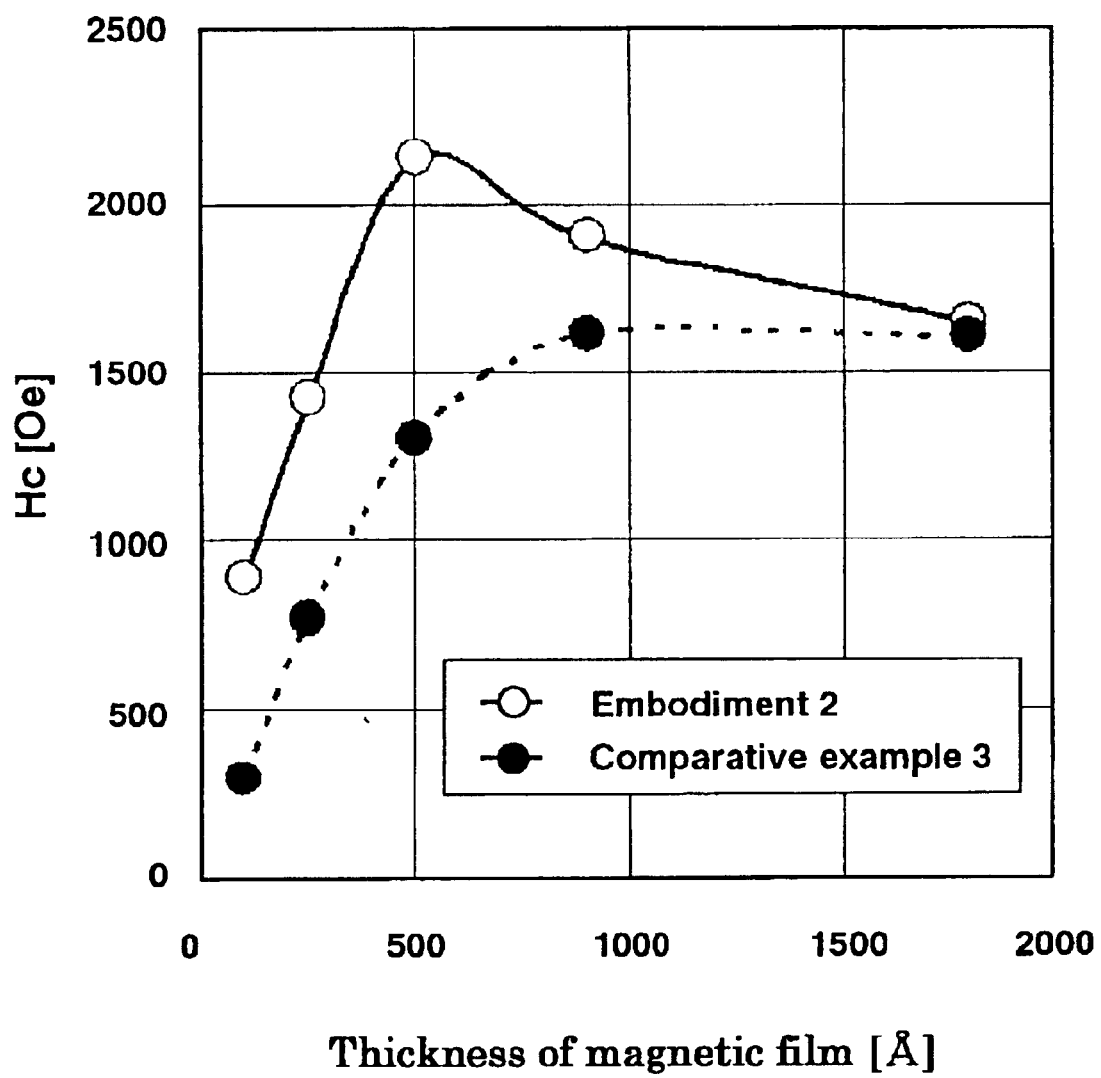
FIG. 5 is a graph showing a relation between a film thickness of a magnetic film and coercive force of the thin film magnetic recording medium according to the first embodiment of the present invention.

FIG. 5 is a graph showing a relation between a film thickness of a magnetic film and coercive force of the thin film magnetic recording medium according to the first embodiment of the present invention.

Figure 6:
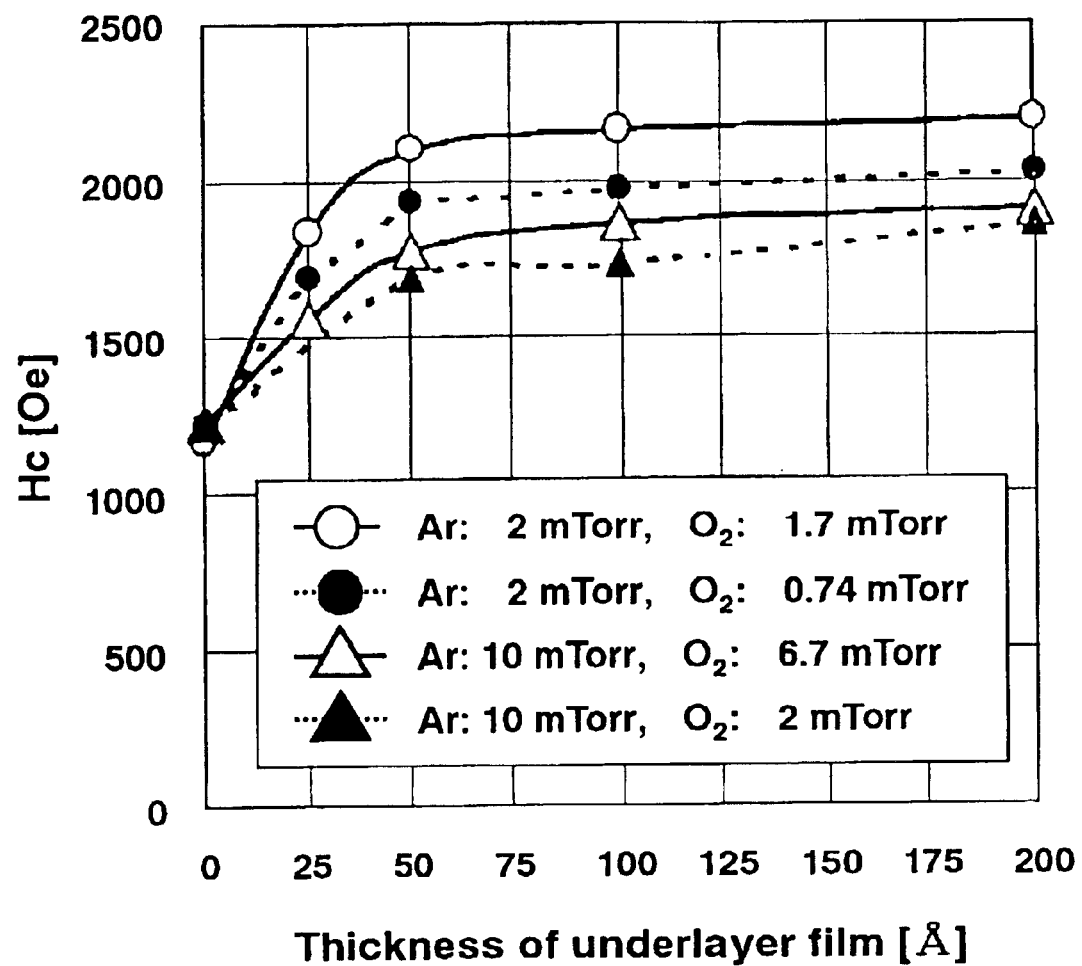
FIG. 6 is a graph showing a relation between a film thickness of a nonmagnetic underlayer film and coercive force of the thin film magnetic recording medium by changing conditions of forming the nonmagnetic underlayer film according to the first embodiment of the present invention.

FIG. 6 is a graph showing a relation between a film thickness of a nonmagnetic underlayer film and coercive force of the thin film magnetic recording medium by changing conditions of forming the nonmagnetic underlayer film according to the first embodiment of the present invention.

Figure 7:
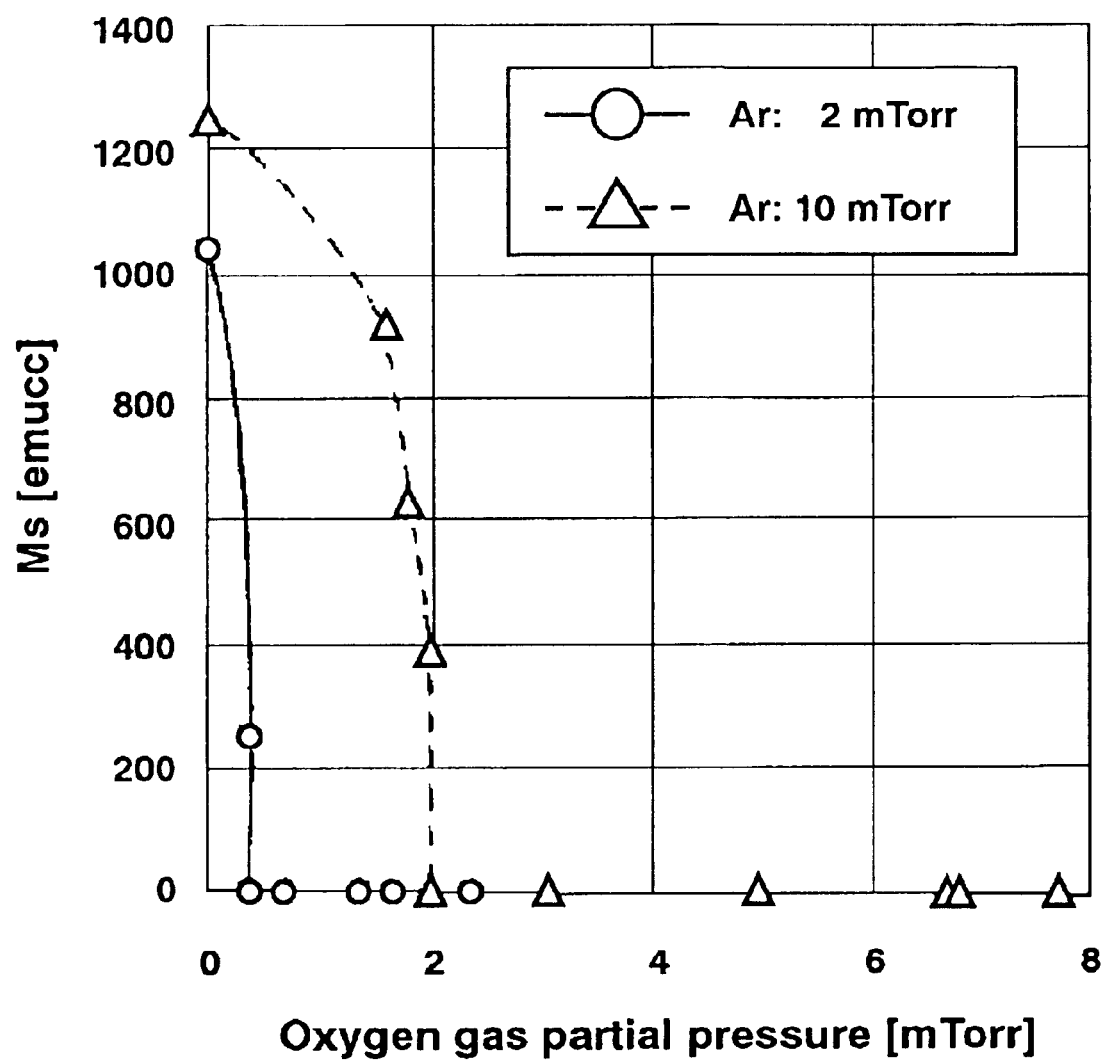
FIG. 7 is a graph showing a relation between a partial pressure of oxygen gas and saturation magnetization so as to obtain the nonmagnetic underlayer film according to the first embodiment of the present invention.

FIG. 7 is a graph showing a relation between a partial pressure of oxygen gas and saturation magnetization so as to obtain the nonmagnetic underlayer film according to the first embodiment of the present invention.

Figure 8:
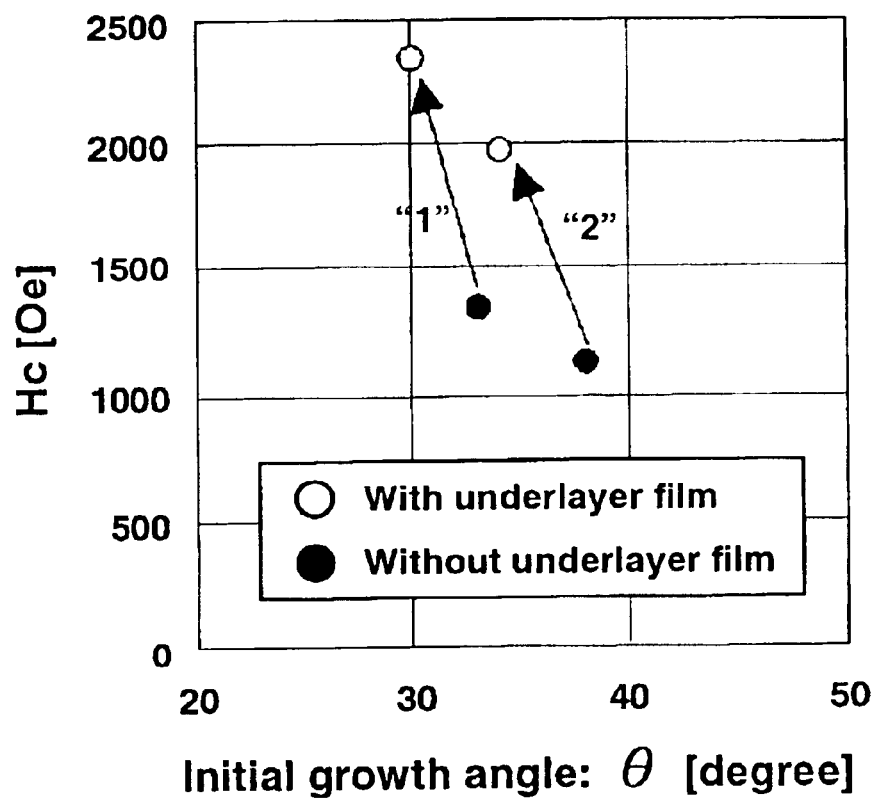
FIG. 8 is a graph showing a relation between an initial growing angle and coercive force of the magnetic film according to the first embodiment of the present invention.

FIG. 8 is a graph showing a relation between an initial growing angle and coercive force of the magnetic film according to the first embodiment of the present invention.

Figure 9:
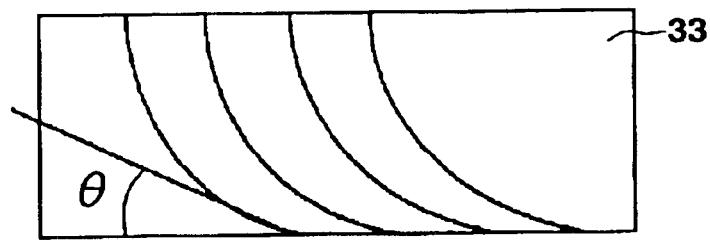
FIG. 9 is a partially enlarged sectional view of the magnetic film shown in FIG. 2.

FIG. 9 is a partially enlarged sectional view of the magnetic film shown in FIG. 2.

Figure 10:
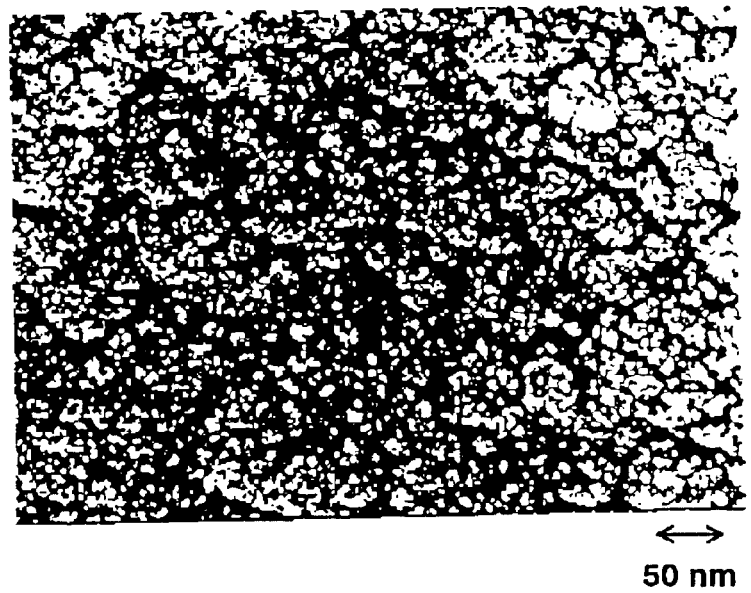
FIG. 10 is an enlarged plan view of the surface of the magnetic film constituting the thin film magnetic recording medium according to the first embodiment of the present invention.

FIG. 10 is an enlarged plan view of the surface of the magnetic film constituting the thin film magnetic recording medium according to the first embodiment of the present invention.

Figure 11:
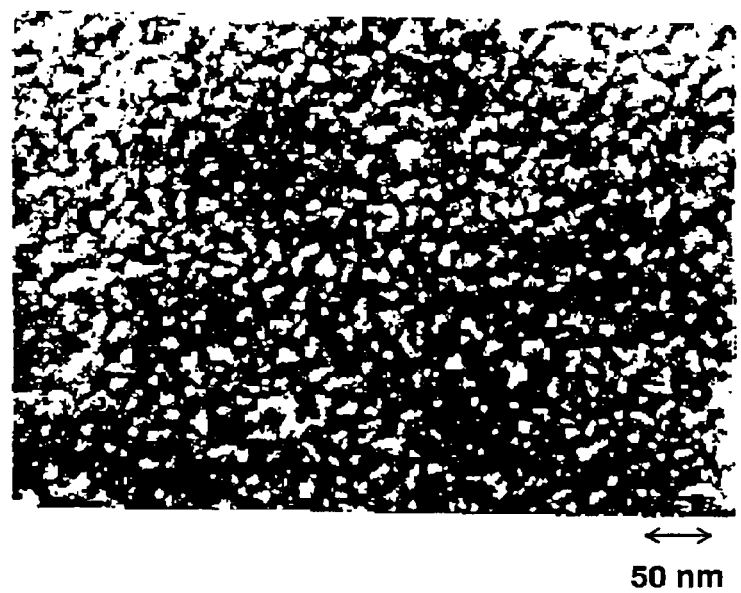
FIG. 11 is an enlarged plan view of the surface of another magnetic film constituting the thin film magnetic recording medium according to a comparative example.

FIG. 11 is an enlarged plan view of the surface of another magnetic film constituting the thin film magnetic recording medium according to a comparative example.

In FIG. 3, a film-forming apparatus 40 for producing a thin film magnetic recording medium (thin film magnetic tape) is composed of a vacuum chamber 1, one set of film winding rolls 2 and 3, one set of tape guide rolls 4 and 5, a base film 31, a cooling can roll 7 being rotatable freely, a crucible 8, incidence angle controlling masks 10 and 49, a piercing electron gun 12, a sputter target 41, and partitions 42a and 42b.

During ordinarily forming a thin film on the base film 31, the base film 31 that is wound around the film winding roll 2 (hereinafter referred to as supply roll 2) runs through the tape guide roll 4, the cooling can roll 7, and the other tape guide roll 5 in a forward direction shown by arrows to the other film winding roll 3 (hereinafter referred to as take-up roll 3).

The crucible 8, which is formed in a box shape and contains a magnetic metal material 11 such as Co, is installed at a lower right hand corner from the cooling can roll 7 inside the vacuum chamber 1.

The piercing electron gun 12, which is an evaporation heat source to melt and evaporate the magnetic metal material 11 in the crucible 8, is mounted on a right wall 1a of the vacuum chamber 1 with pointing at the crucible 8 located diagonally downward to the left. The piercing electron gun 8 emits an electron beam 13 towards the magnetic metal material 11 inside the crucible 8. The electron beam 13 melts the magnetic metal material 11 and evaporates so as to coat a surface of the base film 31, which is moving along the cooling can roll 7.

The electron beam 13 emitted from the piercing electron gun 12 is controlled by a deflection magnet 15, which impresses a deflection magnetic field onto a trajectory of the electron beam 13, and another deflection magnet 14, which is installed near the crucible 8.

In order to prevent deposits in inappropriate areas, incidence angle controlling masks 10 and 49 are installed between the cooling can roll 7 and the crucible 8 as shown in FIG. 3. Allocating one incidence angle controlling mask 49 to a predetermined position of the cooling can roll 7 controls a maximum incidence angle "θ max" of the magnetic metal vapor 11a of the magnetic metal material 11 with respect to the base film 31. On the other hand, allocating the other incidence angle controlling mask 10 to another predetermined position of the cooling can roll 7 controls a minimum incidence angle "θ min".

The sputter target 41 is arranged between the tape guide roll 4 and the incidence angle control mask 49 along the cooling can roll 7.

As shown in FIG. 3, the vacuum chamber 1 is divided into two individual chambers (upper and lower vacuum chambers) 1A and 1B by the partitions 42a and 42b. The upper vacuum chamber 1A is used for forming a thin film by the sputtering method and the lower vacuum chamber 1B is used for forming a thin film by the oblique evaporation process.

Circumferential pressure and constituting gas for forming a thin film varies by each processing method of the sputtering method and the oblique evaporation process, so that the vacuum chamber 1 is divided into the upper vacuum chamber 1A and the lower vacuum chamber 1B by the partitions 42a and 42b. Each of the upper and lower vacuum chambers 1A and 1B is exhausted by an individual exhausting system (not shown) and maintained at predetermined pressure.

In a film forming process of forming a nonmagnetic underlayer film on a virgin base film 31 made of PET as shown in FIG. 3, by using the sputter target 41, actually, by using a Co target, an underlayer film 32 of nonmagnetic CoO is formed on the base film 31 with injecting argon (Ar) gas and oxygen gas through the sputtering method, while the base film 31 wound around the supply roll 2 is running along the outer circumference of the cooling can roll 7 from the maximum incidence angle "θ max" side of the incidence angle controlling mask 49 to the minimum incidence angle "θ min" side of the incidence angle controlling mask 10 and forwarded to the take-up roll 3.

While the base film 31 formed with the underlayer film 32 of nonmagnetic isotropic CoO is running along the outer circumference of the cooling can roll 7, by blowing off oxygen gas $O_2$ through an oxygen gas injection pipe (not shown) towards the magnetic metal vapor 11a evaporated from Co as the magnetic metal material 11 in the crucible 8, the magnetic metal vapor 11a is deposited on the surface of the base film 31 within a range of angle from a maximum incidence angle to a minimum incidence angle that is adjusted to a predetermined angle, and then a CoO magnetic film 33 is formed on the surface of the base film 31 through the oblique evaporation process.

When forming the CoO magnetic film 33 by the oblique evaporation process, a growth particle of the CoO magnetic film 33 is formed on the base film 31 with transferring its evaporation condition from a sparse evaporation condition in the maximum incidence angle "θ max" side to a dense evaporation condition in the minimum incidence angle "θ min" side.

On the other hand, in the underlayer film 32, a nonmagnetic particle grows isotropically, and then the underlayer film 32, is formed in a structure not having a clear grain boundary that separates the aggregation of fine particles.

Further, the base film 31 formed with the underlayer film 32 having such an isotropic structure and the CoO magnetic film 33 is taken up by the take-up roller 3.

In addition there to, a thin film magnetic tape according to the embodiment 1 is produced by such that a film thickness of the underlayer film 32 is varied by a range of 5 Å to 600 Å and the CoO magnetic film 33 is formed by following film-forming conditions.

The film-forming conditions of the underlayer film 32 are as follows:

Partial pressure of Ar (argon gas) is 2 mTorr and
partial pressure of $O_2$ (oxygen gas) is 1.7 mTorr.

The film-forming conditions of the CoO magnetic film 33 are as follows:

Oxygen gas pressure is $3.8 \times 10^{-5}$ Torr and
film thickness of the CoO magnetic film 33 is 500 Å.

COMPARATIVE EXAMPLE 1

Figure 15:
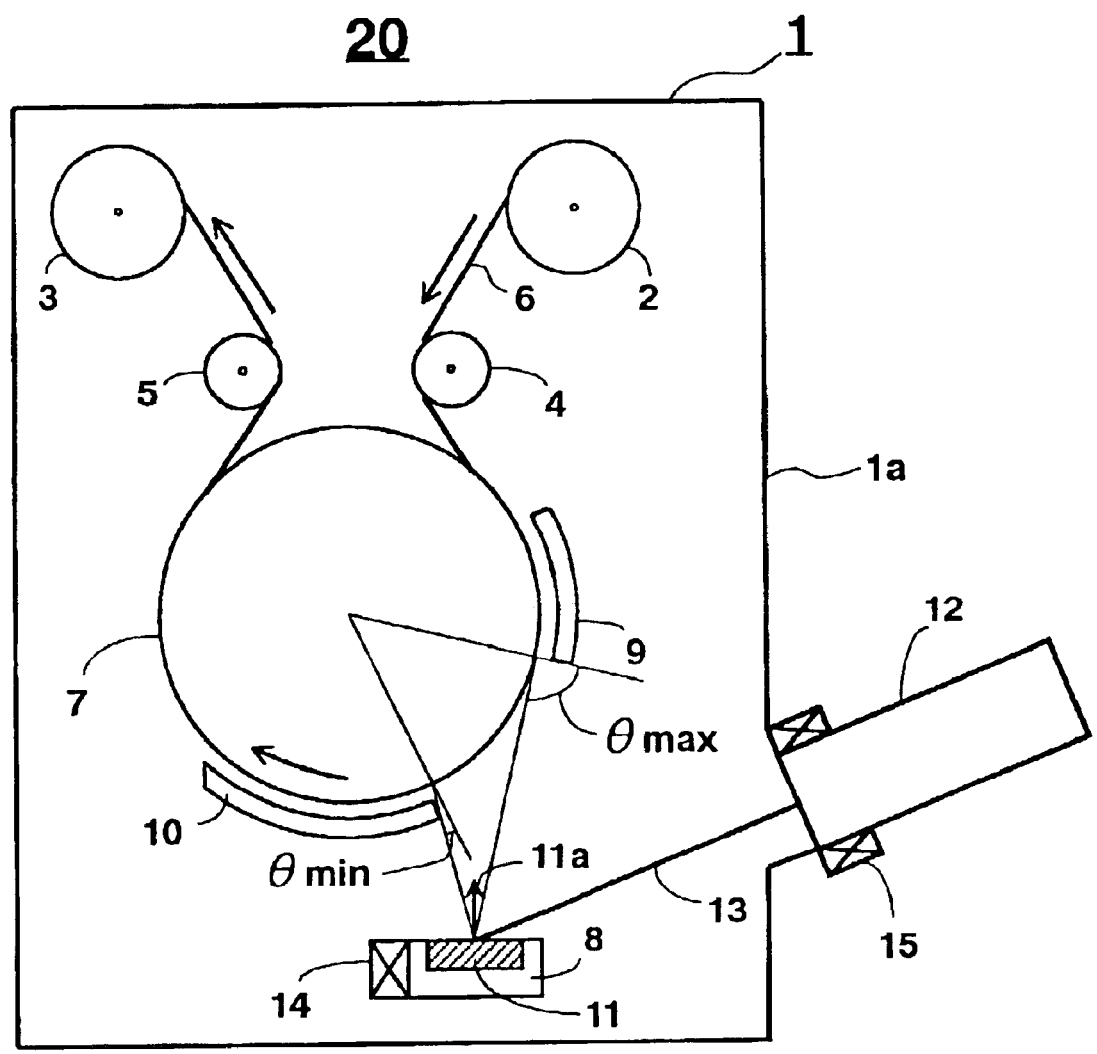
FIG. 15 is a plan view of a film-forming apparatus for producing a thin film magnetic recording medium according to the prior art.

By using the film-forming apparatus 20 shown in FIG. 15 according to the prior art, evaporating Co and injecting oxygen gas of which pressure is $6 \times 10^{-4}$ Torr so as for a film formed on a PET base film 6 to be a nonmagnetic CoO film forms a nonmagnetic CoO underlayer film through the oblique evaporation process. A thin film magnetic tape according to a comparative example 1 is produced by changing a film thickness of the nonmagnetic CoO underlayer film within a range of 5 Å to 600 Å as same as the embodiment 1.

Further, a CoO magnetic film is formed on the nonmagnetic CoO underlayer film under the same film-forming conditions as the embodiment 1 through the oblique evaporation process.

Furthermore, the nonmagnetic CoO underlayer film according to the comparative example 1 is an underlayer film of nonmagnetic columnar CoO in which a nonmagnetic fine particle grows cylindrically and a structure having a clear grain boundary that separates the aggregation of fine particles is formed.

COMPARATIVE EXAMPLE 2

A thin film magnetic tape according to a comparative example 2 is produced by using the film-forming apparatus 20 shown in FIG. 15 as the same manner as the comparative example 1 except for a nonmagnetic underlayer 16 that is not formed on a PET base film 6. Only a CoO magnetic film 18 is formed on the PET base film 6 under the same film-forming conditions as the embodiment 1 through the oblique evaporation process.

With respect to the underlayer film 32 of the thin film magnetic tape produced as the embodiment 1 and the underlayer film of nonmagnetic columnar CoO and the CoO magnetic film of the thin film magnetic tape produced as the comparative example 1, change of coercive force Hc of the magnetic film that is caused by conditions of each underlayer film and film thickness is shown in FIG. 4.

As it is apparent from FIG. 4, coercive force Hc of the thin film magnetic tape of the embodiment 1, that is, the underlayer film 32 of nonmagnetic isotropic CoO (hereinafter referred to as isotropic underlayer film 32) in which a nonmagnetic fine particle grows isotropically and a structure not having a clear grain boundary that separates the aggregation of fine particles is formed is higher than that of the thin film magnetic tape of the comparative example 1, that is, the nonmagnetic underlayer film 16 of columnar CoO (hereinafter referred to as columnar underlayer film 16) in which a nonmagnetic fine particle grows cylindrically and a structure having a clear grain boundary that separates the aggregation of fine particles is formed within the range of film thickness of 5 Å to 300 Å. Particularly, the isotropic underlayer film 32 can obtain more than 2100 Oe of the coercive force Hc that is not obtained by the columnar underlayer film 16 having the same film thickness as the isotropic underlayer film 32 in the range of film thickness of 50 Å to 200 Å.

Further, as it is also apparent from FIG. 4, in the case that the film thickness of the columnar underlayer film 16 is less than 25 Å, the coercive force Hc of the columnar underlayer film 16 is the same as that of the thin film magnetic tape according to the comparative example 2 that is not formed with an underlayer film. Consequently, the columnar underlayer film 16 is ineffective to increase the coercive force Hc in a thinner film thickness of less than 25 Å. However, it is apparent that the isotropic underlayer film 32 is effective to increase the coercive force Hc even in the thinner film thickness range.

Furthermore, it is apparent that the coercive force Hc of the thin film magnetic tape without the underlayer film is as many as 1200 Oe approximately and the thin film magnetic tape can not receive practical application.

(Embodiment 2)

An isotropic underlayer film 32 is formed under the same film-forming conditions as the embodiment 1 in the film thickness of 50 Å by the sputtering method.

Further, a CoO magnetic film 33 is formed on the isotropic underlayer film 32 under the same film-forming conditions as the embodiment 1 with having a film thickness within a range of 100 Å to 1800 Å by the oblique evaporation process.

COMPARATIVE EXAMPLE 3

A thin film magnetic tape according to a comparative example 2 is produced by the same film-forming conditions as the embodiment 2 except for the isotropic underlayer film 32 that is not formed. Only a CoO magnetic film 33 having a film thickness within a range of 100 Å to 1800 Å is formed on a PET base film 31 by the oblique evaporation process.

A relation between a film thickness of the magnetic film and coercive force Hc of the thin film magnetic tapes according to the embodiment 2 and the comparative example 3 is shown in FIG. 5. As shown in FIG. 5, the coercive force Hc increases in the range of film thickness of the magnetic film 33 of 100 Å to 1000 Å by forming the isotropic underlayer film 32, and the effect of the isotropic underlayer film 32 is exhibited. Particularly, the coercive force Hc of the thin film magnetic tape of the embodiment 2 having the isotropic underlayer film 32 is higher than that of the comparative example 3 not having an isotropic underlayer film 32 by 600 Oe even at 100 Å of the film thickness. Consequently, it is apparent that the isotropic underlayer film 32 is effective to increase the coercive force Hc.

FIG. 6 is an explanatory drawing for obtaining a most optimal film-forming condition of an isotropic underlayer film 32 when the film thickness of the CoO magnetic film 33 is set to 500 Å. Particularly, it exhibits a relation between the film thickness of the isotropic underlayer film 32 and the coercive force Hc when changing the partial pressure of oxygen gas $O_2$ and argon gas Ar in conjunction with changing the film thickness of the isotropic underlayer film 32.

As shown in FIG. 6, it is found that high coercive force Hc can be obtained at 2 mTorr of the Ar partial pressure and 1.7 mTorr of the $O_2$ partial pressure in each film thickness.

FIG. 7 is an explanatory drawing that exhibits a relation between the oxygen gas ($O_2$) partial pressure and saturation magnetization Ms of the isotropic underlayer film 32. As shown in FIG. 7, there existed no magnetization in a region of more than 0.74 mTorr of the $O_2$ partial pressure at 2 mTorr of the Ar partial pressure or another region of more than 2 mTorr of the $O_2$ partial pressure at 10 mTorr of the Ar partial pressure. Therefore, it is apparent that nonmagnetic CoO can be obtained in these regions. Consequently, in the first embodiment of the present invention, the Ar partial pressure and the $O_2$ partial pressure shown in FIG. 6 are decided to be within these regions.

FIG. 8 shows a relation between an initial growth angle θ and coercive force Hc in a magnetic film 33 and FIG. 9 shows the initial growth angle θ in the magnetic film 33. An actual angle value of the initial growth angle θ is obtained from a cross sectional picture of magnetic film that is taken while observing the magnetic film through the above-mentioned transmission electron microscope (TEM).

Further, FIG. 8 is an explanatory drawing that exhibits a change of coercive force Hc and an initial growth angle θ in response to a case whether or not a nonmagnetic CoO isotropic underlayer film having a film thickness of 100 Å, which is formed by the sputtering method, is provided when forming a CoO magnetic film under a film-forming condition "1", which can obtain coercive force Hc of 1400 Oe from a CoO magnetic film having a film thickness of 350 Å without an underlayer film, and a film-forming condition "2", which can obtain coercive force Hc of 1100 Oe from a CoO magnetic film having a film thickness of 350 Å without an underlayer film. Providing an isotropic underlayer film decreases the initial growth angle by 3 to 4 degrees. Therefore, it is obvious that the isotropic underlayer film has a strong effect of laying down an initial growth direction towards the horizontal direction. Consequently, it is supposed that a self-shadowing effect increases and high coercive force Hc can be obtained as a result of the strong effect.

Furthermore, when forming a CoO magnetic film under the film-forming conditions "1" and "2" of enabling to obtain coercive force Hc of 1400 Oe and 1100 Oe, providing a columnar underlayer film decreases the initial growth angle by one degree to two degrees in response to a case whether or not a nonmagnetic CoO columnar underlayer film having a film thickness of 100 Å formed by the oblique evaporation process is provided. Therefore, it is supposed that an isotropic underlayer film has a stronger effect of laying down an initial growth direction towards the horizontal direction than a columnar underlayer film. Consequently, a self-shadowing effect increases and an effect of increasing coercive force Hc is enlarged as a result of the strong effect.

With referring to FIGS. 10 and 11, difference of an effect whether or not an isotropic underlayer film is provided is explained next.

FIG. 10 is an enlarged picture showing a surface state of a magnetic film that constitutes a thin film magnetic recording medium according to the first embodiment of the present invention. In other words, FIG. 10 is a SEM (scanning electron microscope) picture of the surface of the magnetic film according to the embodiments 1 and 2, which is provided with a nonmagnetic isotropic underlayer film by applying the sputtering method, taken by a high resolution SEM (model H-5000 manufactured by Hitachi, Ltd.) FIG. 11 is a SEM picture of the surface of the magnetic film according to the comparative example 2, which is not provided with a nonmagnetic isotropic underlayer film, taken by the high resolution SEM.

It is apparent from the surface of the magnetic film observed by the high resolution SEM that there is existed no gap in the grain boundary of the CoO magnetic film, which is not provided with an underlayer film, shown in FIG. 11 according to the comparative example 2. However, there existed a gap clearly in the grain boundary of the CoO magnetic film, which is provided with the isotropic underlayer film, shown in FIG. 10 according to the embodiments 1 and 2. It is supposed that a gap is generated in the grain boundary of the CoO magnetic film by the nonmagnetic isotropic CoO underlayer film, and then isolation of particles is hastened and resulted in increasing the coercive force Hc.

[Second Embodiment]

Figure 12:
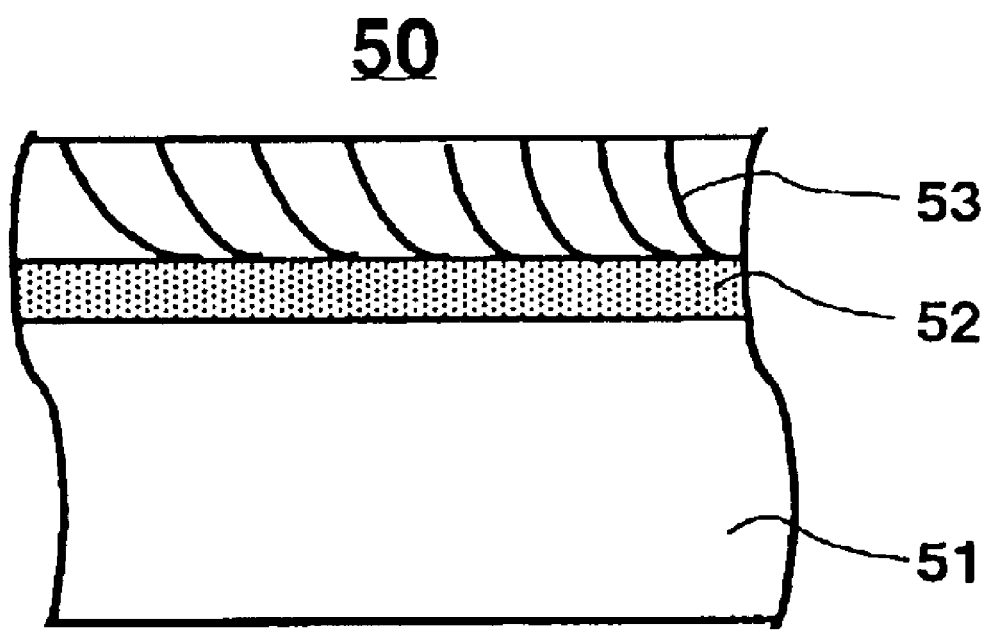
FIG. 12 is a cross sectional view of a thin film magnetic recording medium according to a second embodiment of the present invention.

FIG. 12 is a cross sectional view of a thin film magnetic recording medium according to a second embodiment of the present invention.

Figure 13:
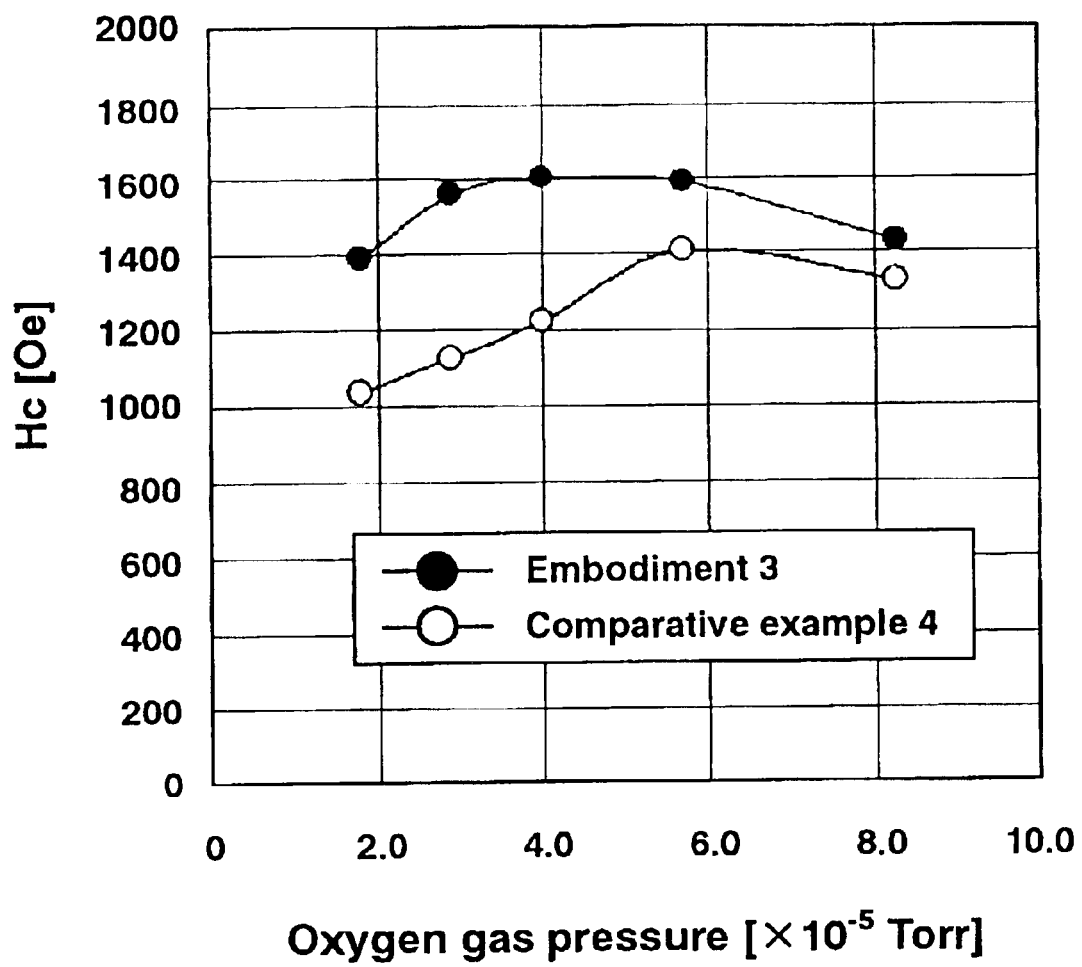
FIG. 13 is a graph showing a relation between a partial pressure of oxygen gas and coercive force Hc by changing conditions of forming a nonmagnetic underlayer film according to the second embodiment of the present invention.

FIG. 13 is a graph showing a relation between a partial pressure of oxygen gas and saturation magnetization by changing conditions of forming a nonmagnetic underlayer film according to the second embodiment of the present invention.

Figure 14:
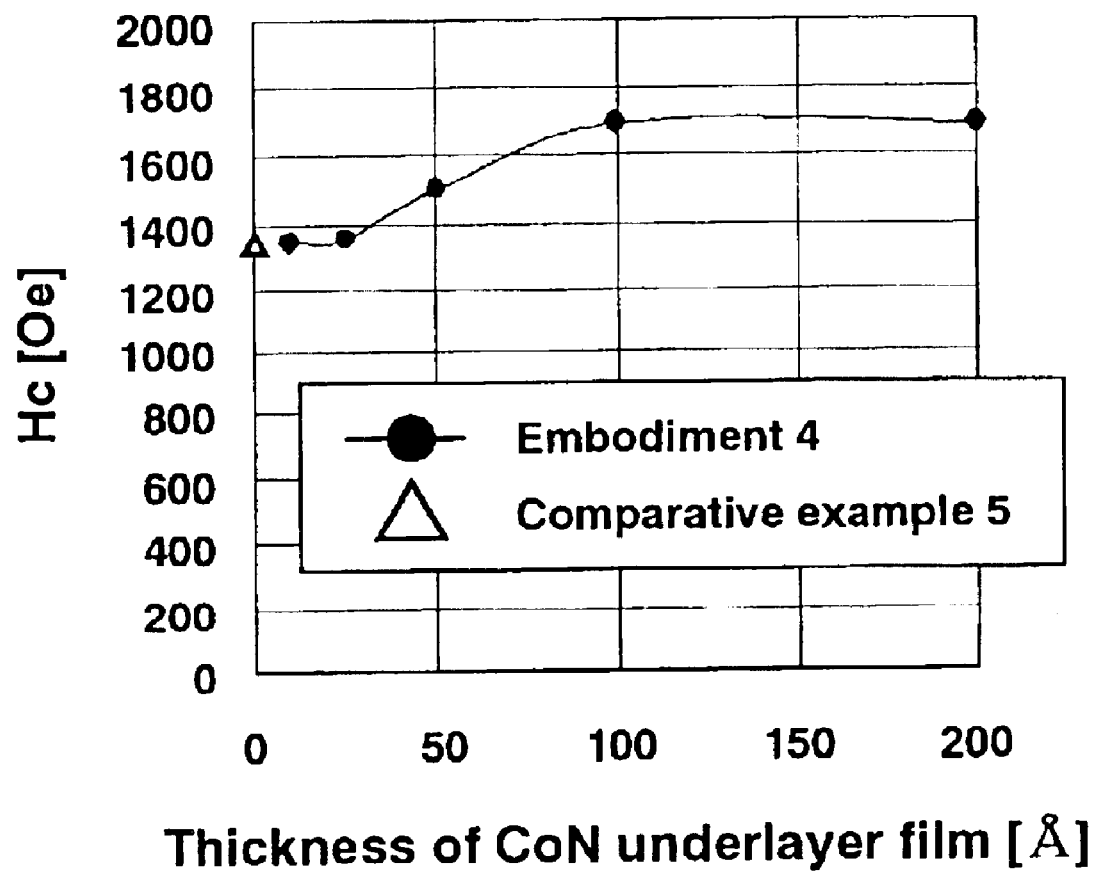
FIG. 14 is a graph showing a relation between a film thickness of the nonmagnetic underlayer film and coercive force of the thin film magnetic recording medium according to the second embodiment of the present invention.

FIG. 14 is a graph showing a relation between a film thickness of the nonmagnetic underlayer film and coercive force of the thin film magnetic recording medium according to the second embodiment of the present invention.

In FIG. 12, a thin film magnetic recording medium 50 is composed of a nonmagnetic substrate 51 that is a base film and made of a PET film or like, an underlayer film 52 that is constituted by a nonmagnetic metal nitride film formed on the nonmagnetic substrate 51 by the sputtering method and a magnetic film 53 of Co-system that is formed on the underlayer film 52 by the oblique evaporation process.

(Embodiment 3)

A method of producing the thin film magnetic recording medium 50 according to the second embodiment of the present invention is explained next.

Essentially, the film-forming apparatus 40 shown in FIG. 3 is used as an apparatus for producing the thin film magnetic recording medium (thin film magnetic tape) 50, so that explaining construction of the apparatus in detail is omitted and only a difference from the film-forming apparatus 40 is explained.

In the film-forming apparatus 40 used for producing the thin film magnetic tape 50 according to the second embodiment, a difference from the thin film magnetic tape 30 according to the first embodiment is basically the nonmagnetic underlayer film. A nitride film is used for the nonmagnetic underlayer film of the thin film magnetic tape 50. Consequently, using a Co target as the sputter target 41 and injecting argon gas (Ar) and nitrogen gas ($N_2$) forms a film through the sputtering method.

In a film-forming process of forming a nonmagnetic underlayer film on a virgin base film 31(51) made of PET as shown in FIG. 3, by using the sputter target 41, actually, by using a Co target, an underlayer film 52 of nonmagnetic Co-nitride is formed on the base film 51 with injecting argon (Ar) gas and nitrogen gas ($N_2$) through the sputtering method, while the base film 51 wound around the supply roll 2 is running along the outer circumference of the cooling can roll 7 from the maximum incidence angle "θ max" side of the incidence angle controlling mask 49 to the minimum incidence angle "θ min" side of the incidence angle controlling mask 10 and forwarded to the take-up roll 3.

While the base film 51 formed with the nonmagnetic underlayer 52 of Co-nitride is running along the outer circumference of the cooling can roll 7, by blowing off oxygen gas $O_2$ through the oxygen gas injection pipe (not shown) towards the magnetic metal vapor 11a evaporated from Co as the magnetic metal material 11 in the crucible 8, the magnetic metal vapor 11a is deposited on the surface of the base film 51 within a range of angle from a maximum incidence angle to a minimum incidence angle that is adjusted to a predetermined angle, and then a CoO magnetic film 53 is formed on the surface of the base film 51 through the oblique evaporation process.

When forming the CoO magnetic film 53 by the oblique evaporation process, a growth particle of the CoO magnetic film 53 is formed on the base film 51 with transferring its evaporation condition from a sparse evaporation condition in the maximum incidence angle "θ max" side of the incidence angle controlling mask 49 to a dense evaporation condition in the minimum incidence angle "θ min" side of the incidence angle controlling mask 10.

Further, the base film 51 formed with the nonmagnetic underlayer film 52 of Co-nitride having the above-mentioned structure and the CoO magnetic film 53 is taken up by the take-up roller 3.

Furthermore, a film thickness of the nonmagnetic underlayer 52 of Co-nitride is assigned to be 100 Å and a film thickness of the CoO magnetic film 53 is formed by following film-forming conditions.

The film-forming conditions of the nonmagnetic underlayer film 52 of Co-nitride are as follows:

Partial pressure of Ar (argon gas) is 2 mTorr and
partial pressure of $N_2$ (nitrogen gas) is 1 mTorr.

The film-forming conditions of the CoO magnetic film 53 are as follows:

Oxygen gas pressure is $1.8 \times 10^{-5}$ Torr to $8.3 \times 10^{-5}$ Torr and film thickness of the CoO magnetic film 53 is 500 Å.

COMPARATIVE EXAMPLE 4

A thin film magnetic recording medium according to the comparative example 4 is produced such that a CoO magnetic film is formed on the base film 51 by the same film-forming conditions as the embodiment 3 so as for the film thickness of the magnetic film 53 to be 500 Å without forming the nonmagnetic underlayer 52 of Co-nitride.

FIG. 13 is a graph showing a relation between a partial pressure of oxygen gas and coercive force Hc in accordance with a nonmagnetic underlayer film with respect to the thin film magnetic recording mediums according to the embodiment 3 and the comparative example 4. As shown in FIG. 13, in a case that the nonmagnetic underlayer 52 of Co-nitride is formed by oxygen gas pressure within a range of $1.8 \times 10^{-5}$ Torr to $4.0 \times 10^{-5}$ Torr while forming a CoO magnetic film, Hc of the CoO magnetic film 53 is higher than that of a case of forming no nonmagnetic underlayer film 52 by 400 Oe maximum.

Further, it is also apparent that the CoO magnetic film 53 can obtain high coercive force Hc at oxygen gas pressure within a range of $4.0 \times 10^{-5}$ Torr to $5.7 \times 10^{-5}$ Torr.

(Embodiment 4)

Using a Co target and injecting Ar gas and $N_2$ gas under the same Ar and $N_2$ gas partial pressure as the embodiment 3 forms the nonmagnetic underlayer 52 of Co-nitride on the base film 51 by changing a film thickness within a range of 10 Å to 200 Å through the sputtering method. Then, in the film-forming apparatus 40 shown in FIG. 3, evaporating Co by the oblique evaporation process and injecting $O_2$ gas forms a CoO magnetic film 53 having a film thickness of 500 Å on the nonmagnetic underlayer film 52 of Co-nitride under the $O_2$ gas pressure of $4.1 \times 10^{-5}$ Torr.

COMPARATIVE EXAMPLE 5

A thin film magnetic recording medium according to the comparative example 5 is produced such that a CoO magnetic film 53 is formed on the base film 51 by the same film-forming conditions as the embodiment 4 so as for the film thickness of the magnetic film 53 to be 500 Å through the oblique evaporation process without forming the nonmagnetic underlayer 52 of Conitride.

FIG. 14 is a graph showing a relation between a film thickness of the nonmagnetic underlayer film of Co-nitride and coercive force Hc of the thin film magnetic tapes according to the embodiment 4 and the comparative example 5. As shown in FIG. 14, the coercive force Hc of the thin film magnetic tape of the embodiment 4, which is formed with the nonmagnetic underlayer film 52 of Co-nitride, is higher than that of the comparative example 5, which is formed without the nonmagnetic underlayer film 52, within a film thickness range of 50 Å to 200 Å. Consequently, it is apparent that the nonmagnetic underlayer film 53 of Co-nitride is effective to increase the coercive force Hc.

According to an observation of the surface of the CoO magnetic film 53 through a high resolution SEM, although not shown in any drawings, there is existed no gap in the grain boundary of the CoO magnetic film 53, which is not provided with an underlayer film according to the comparative examples 4 and 5. However, there existed a gap clearly in the grain boundary of the CoO magnetic film 53, which is provided with the nonmagnetic underlayer film 52 of Co-nitride according to the embodiments 3 and 4. It is supposed that a gap is generated in the grain boundary of the CoO magnetic film 53 by the nonmagnetic underlayer film 52 of Co-nitride, and then isolation of particles is hastened and resulted in increasing the coercive force Hc.

While the invention has been described above with reference to the specific embodiment thereof, it is apparent that many changes, modifications and variations in the arrangement of equipment and devices and in materials can be made without departing the invention concept disclosed herein. For example, the sputtering method is explained as a typical film forming method of an isotropic underlayer film. However, the sputtering method is just one method of film forming methods. Accordingly, the film forming method is not limited to the sputtering method as far as an isotropic underlayer film can be obtained.

According to an aspect of the present invention, there provided a thin film magnetic recording medium, which is low in dropout and excellent in mass-productivity. The thin film magnetic recording medium is composed of an underlayer film, which is constituted by a nonmagnetic metal oxide film and formed on a nonmagnetic substrate, and a magnetic film of Co system, which is formed on the underlayer film through the oblique evaporation process. They are laminated in order, wherein fine particles of the nonmagnetic metal oxide film in the nonmagnetic film grow isotropically and the underlayer film is formed in a construction not having a clear grain boundary, which separates an aggregation of the fine particles.

According to another aspect of the present invention, there provided a thin film magnetic recording medium, which is composed of an underlayer film that is constituted by a nonmagnetic metal nitride film and formed on a nonmagnetic substrate and a magnetic film of Co system that is formed on the underlayer film through the oblique evaporation process, laminated in order. Consequently, the thin film magnetic recording medium is high in coercive force Hc, low in dropout and excellent in mass-productivity.

What is claimed is:

1. A thin film magnetic recording medium comprising: an underlayer film constituted by a nonmagnetic metal oxide film and formed on a nonmagnetic substrate with the underlayer film having a thickness within a range of 5 Å TO 300 Å; and a magnetic film of cobalt system formed on the underlayer film so that each is in direct contact with one another through an oblique evaporation process, with the thin film magnetic recording medium being further characterized in that fine particles of the nonmagnetic metal oxide film grow isotropically in the underlayer film constituted by the nonmagnetic metal oxide film and the underlayer film is formed in a construction without having a clear grain boundary separating an aggregation of the fine particles.

2. The thin film magnetic recording medium in accordance with claim 1, wherein the underlayer film is formed by a sputtering method.

3. A thin film magnetic recording medium comprising: an underlayer film constituted by a nonmagnetic metal oxide film and formed on a nonmagnetic substrate wherein the underlayer film is a film of CoO; and a magnetic film of cobalt system formed on the underlayer film so that each is in direct contact with one another through an oblique evaporation process, with the thin film magnetic recording medium being further characterized in that fine particles of the nonmagnetic metal oxide film grow isotropically in the underlayer film constituted by the nonmagnetic metal oxide film and the underlayer film is formed in a construction without having a clear grain boundary separating an aggregation of the fine particles.

4. The thin film magnetic recording medium in accordance with claim 3, wherein the underlayer film is formed by a sputtering method.

5. The thin film magnetic recording medium in accordance with claim 3, wherein a film thickness of the underlayer film is within a range of 5 Å to 300 Å.

* * * * *